July 6, 1943.　　　O. A. STRASSMAN　　　2,323,688
VEGETABLE HARVESTER
Filed May 27, 1941　　　3 Sheets-Sheet 2
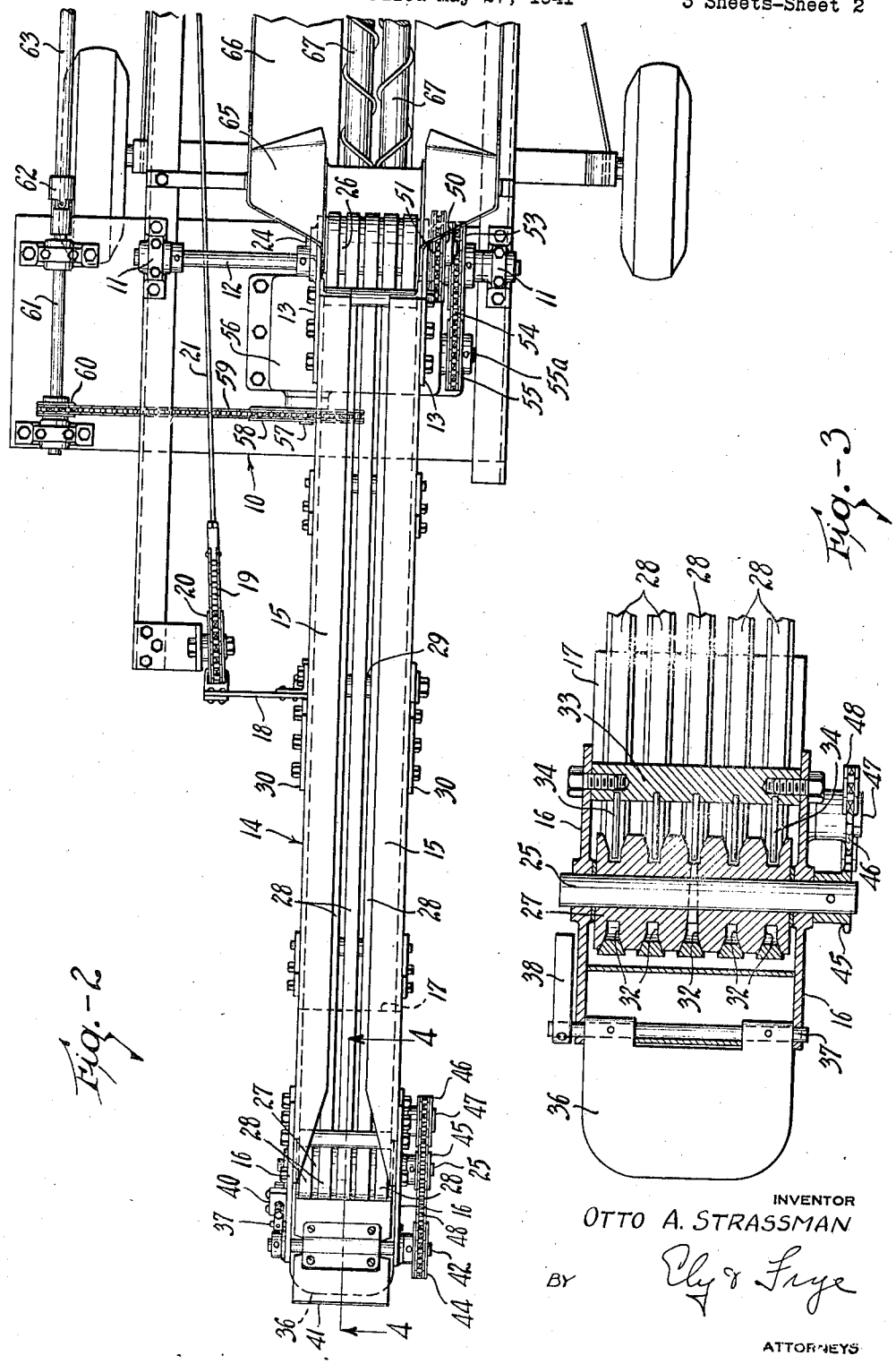
INVENTOR
OTTO A. STRASSMAN
BY
ATTORNEYS

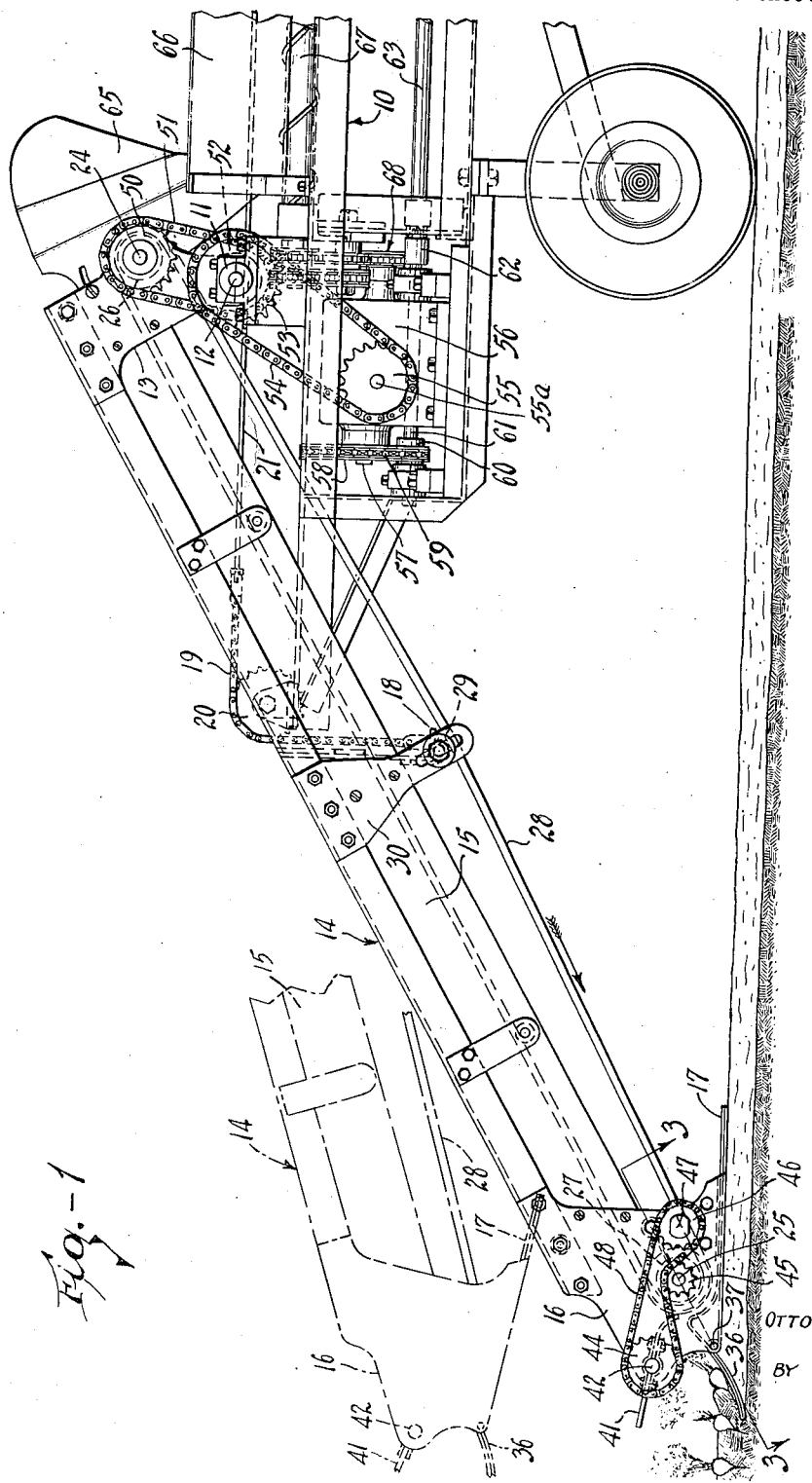

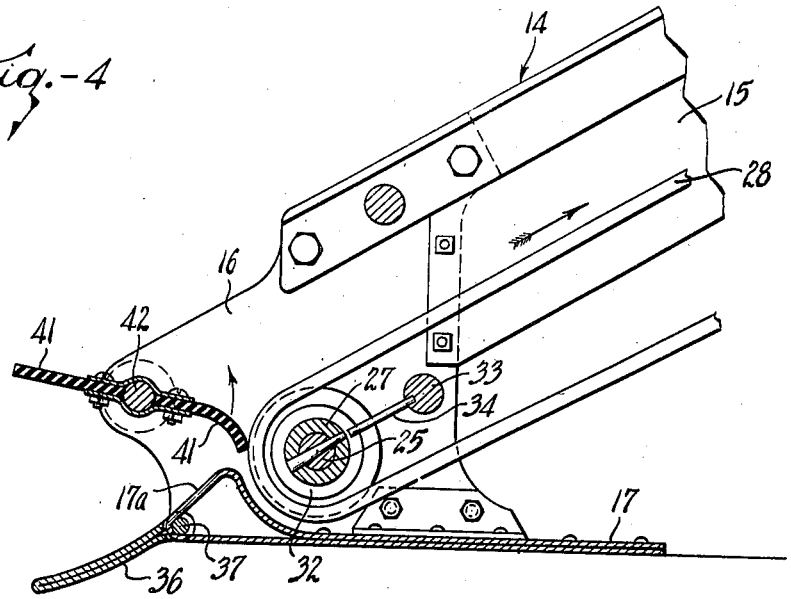
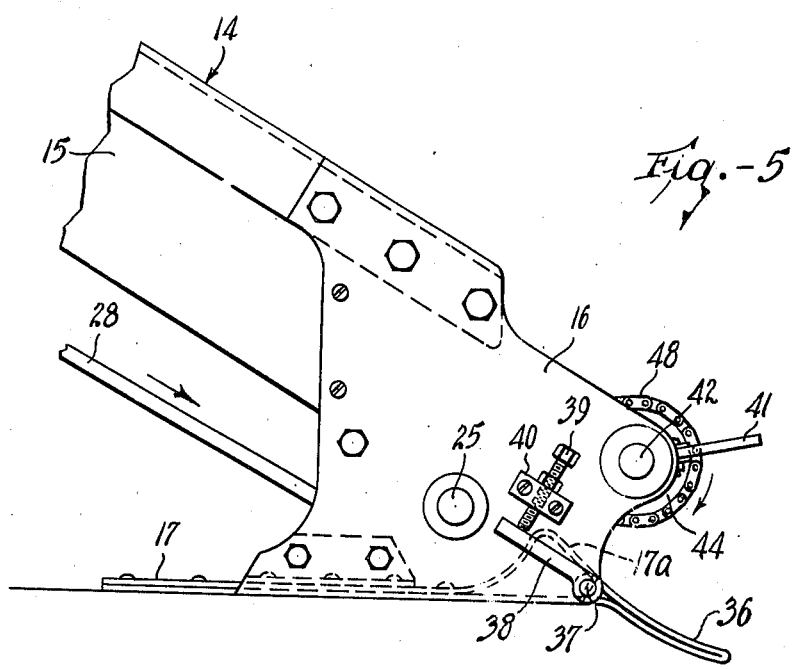

Patented July 6, 1943

2,323,688

UNITED STATES PATENT OFFICE 2,323,688

VEGETABLE HARVESTER

Otto A. Strassman, Akron, Ohio, assignor of three-fourths to Jacob Graber, Hartville, Ohio Application May 27, 1941, Serial No. 395,377

4 Claims. (Cl. 55—109)

This invention relates to vegetable harvesters, and more especially it relates to apparatus for harvesting root vegetables having leafy tops, such as beets, carrots, radishes, and the like.

The invention is designed primarily for use in association with apparatus for assembling substantially uniform numbers of the vegetables into bunches, and then applying rubber bands to the bunches to hold together the several units contained in each. Bunching apparatus of the character mentioned functions best when the vegetables are delivered thereto in orderly succession and substantially free from dirt.

Accordingly, the chief objects of the invention are to provide an improved vegetable harvester that will remove most of the dirt from the vegetables as it removes them from the ground; that will dispose of said dirt in a simple manner; that will convey the vegetables in orderly succession to its delivery end; and to provide in a simple manner for varying the depth to which the harvester enters the soil. Other objects will be manifest as the description proceeds.

Of the accompanying drawings:

Fig. 1 is a side elevation of an improved vegetable harvester embodying the invention;

Fig. 2 is a plan view thereof;

Fig. 3 is a section, on a larger scale, on the line 3—3 of Fig. 1;

Fig. 4 is a section, on a larger scale, on the line 4—4 of Fig. 2, and

Fig. 5 is a detail elevation of the leading end of the harvester, on a larger scale, on the side thereof opposite that shown in Fig. 1.

The apparatus shown is adapted especially for the harvesting of radishes, and is particularly useful upon truck farms that raise crops of sufficient size to warrant the use of mechanical planters, that plant a plurality of equally spaced rows of seeds, the seeds being spaced apart properly for most efficient growth. For example, the seeds in a row are spaced about two inches apart so as to produce 80 radishes to every 14 feet of row, and adjacent rows are spaced 9 inches apart. The arrangement makes it possible and feasible to harvest several rows at a time. Thus, it will be understood that although the apparatus shown and described herein is capable of harvesting but one row of radishes at a time, multiple units for harvesting as many as five rows at a time may be provided, said units being propelled and operated by a single power unit such as a tractor.

Referring now to the drawings, there is shown at 10 the front end portion of a wheeled carriage that is propelled by a motor-driven tractor (not shown) at the rear thereof. The carriage 10 comprises an open metal framework, and mounted upon the top rails thereof, at opposite sides of the carriage near its front end, are bearing brackets 11, 11 in which a horizontal shaft 12 is journaled. Swiveled on shaft 12 are the spaced-apart end brackets 13, 13 at one end of an elevator that is designated as a whole by the numeral 14, said elevator comprising longitudinally extending frame-and-side members 15, 15 at each side thereof, and end brackets 16, 16 at the end thereof remote from the brackets 13. The elevator 14 is adapted to be propelled along the ground by the driven carriage 10, with the forward end of the elevator in depressed position when the apparatus is in operation, there being a smooth flat metal shoe or skid 17 at the forward end of the elevator, which shoe is designed to rest upon the ground and slide thereover. The elevator may be raised to the inoperative position shown in broken lines in Fig. 1, and to this end a bracket 18 is secured to one of the frame members 15 and projects laterally therefrom. One end of a sprocket chain 19 is secured to bracket 18 and extends therefrom over a sprocket 20 that is suitably mounted upon the framework of carriage 10, the other end of chain 19 being connected to a pull-rod 21 that extends rearwardly and connects with suitable lever means (not shown) by means of which it may be adjusted longitudinally to different positions. In being raised or lowered the elevator turns angularly about the shaft 12 as an axis.

Journaled in the upper end brackets is a driven shaft 24, and journaled in the lower end brackets 16 is a shaft 25. Secured upon the driven shaft 24 between brackets 13, is a grooved pulley 26, and a similar grooved pulley 27 is secured upon shaft 25. Each of said pulleys is formed with a plurality of circumferential, spaced-apart grooves, herein shown as five in number, and received in said grooves are respective conveyor belts 28. The pulley 26 is driven in the direction that causes the upper reach of each conveyor belt 28 to travel obliquely upwardly toward said pulley 26, as indicated by the arrows in several figures of the drawings, the arrangement being such as to convey vegetables, received on the belts at the lower end of the elevator, to the upper end of the elevator and to discharge them thereat. The belts 28 are laterally spaced apart from each other to enable soil dislodged from the freshly harvested vegetables to pass between the belts and drop to the ground, the spacing, however, being less than the minimum size of the vegetables to be harvested so that the vegetables do not drop between the belts. Also the frame-and-side members 15 are sufficiently close to the outermost belts 28 to prevent vegetables from falling from the conveyor. For maintaining the belts 28 in taut condition, a belt-tightening roll 29 is engaged with the lower reach of each of said belts, said roll being adjustably carried by brackets 30, 30 secured to the respective frame members 15 and projecting downwardly therefrom.

The construction of the belts 28 and the pulleys 26 and 28 is best shown in Fig. 3 wherein it will be seen that the belts are side-driving belts of the so-called U-shape. The pulley 27, and also pulley 26 which is identical therewith has belt-receiving grooves 32, 32 that have sloped or tapered surfaces for driving engagement with the lateral faces of the belts, said grooves extending radially inwardly of the pulley a substantial distance beyond said belt engaging surfaces and beyond the inner faces of the belts. Thus, there is a substantial amount of groove below each belt on the pulley, in excess of that required for the belts, which grooves receive soil that may drop from the vegetables as they are harvested. For cleaning the belt-grooves of pulley 27 of soil that may collect therein, a scraping means is provided, said scraper comprising a bar 33 that is disposed parallel to the axis of the pulley at the rear thereof, and fingers 34, 34 that project radially from said bar and extend into the respective grooves 32, substantially to the bottom thereof. The bar 33 has its ends secured to the respective end brackets 16, and is disposed between the upper and lower reaches of the belts 28. No scraping means is provided for the belt pulley 26 since most of the soil is jarred loose from the vegetables before they reach the upper end of the elevator.

Removal of vegetables from the ground is accomplished by means of a share or scoop 36 located at the forward end of the elevator, beyond the skid 17 thereat. As is best shown in Figs. 4 and 5, the scoop 36 is slightly arcuate in fore-and-aft direction, with its concave side uppermost, the nose or leading edge of the scoop having rounded corners, as shown in Fig. 3, so as more readily to pass small obstructions. The scoop is supported from its rear margin, which margin is secured to a shaft 37 that is journaled at its ends in the end brackets 16. The scoop 36 is arranged for angular adjustment so as to control the depth to which it enters the soil, and to this end one end portion of the shaft 37 is extended laterally of an end bracket 16 and provided with a lever 38. An adjusting screw 39, Fig. 5, threaded through a cleat 40 secured to the outer face of said bracket 16, is engageable with the free end of lever 38 for adjusting said lever angularly to control the angular position of said scoop. The rear end of the scoop 36 is disposed somewhat forwardly of the lower belt pulley 27, and positioned between the latter and the scoop is the forward end portion 17a of the skid 17, a portion of the latter passing about the shaft 37 and extending rearwardly, substantially in continuation of the scoop 36, toward the top of pulley 27. Close to the latter said portion 17a is reversely bent rearwardly and downwardly so as to pass near the periphery of the pulley, concentrically thereof, as is best shown in Fig. 4, and therebeyond joins the main body of the skid directly below said pulley. The arrangement is such that there is but a small gap in the vegetable supporting structures between the nose of the scoop 36, and the top of the pulley 27 and conveyor belts 28 thereabout, the skid portion 17a constituting, in effect, an apron or rearward extension of the scoop.

To facilitate the passage of the vegetables across said gap, a sweep is provided, said sweep comprising a pair of relatively stiff but flexible paddles or blades 41, 41 that project radially from a rotatable shaft 42 that is journaled at its ends in the end brackets 16. The blades 41 are rectangular shape and preferably are made of rubber composition. The shaft 42 is so positioned and the blades 41 are of such radial width that outer marginal portions thereof engage portion 17a of the skid 17 and also the belts moving about pulley 27 as said shaft 42 is rotated in the direction indicated by the arrow, as is best shown in Fig. 4. Thus, vegetables forced upwardly onto the scoop by the movement thereof through the soil are engaged by the sweep-blades 41 and impelled thereby onto the conveyor belts 28. Engagement of the blades 41 with skid portion 17a and belts 28 is such as to cause flexure of said blades with the result that as they pass out of engagement with said elements the flexed portions snap forwardly to normal position and thereby impart a sudden additional impetus to the movement of the vegetables that effectively impels the vegetables onto the conveyor belts. Furthermore, sudden impetus imparted to the vegetables by the blades serves to dislodge most if not all of the soil that may be clinging to the vegetables, and they arrive at the delivery end of the elevator in relatively clean condition.

For effecting rotation of the blades 41, the shaft 42 thereof is extended laterally of one of the end brackets 16, and provided with a sprocket 44 on the projecting portion thereof. In like manner the shaft 25 of pulley 27 is extended laterally of the same end bracket 16 and provided with a sprocket 45. An idler sprocket 46 is journaled on a stub shaft 47 that projects laterally from the same end bracket 16, rearwardly of the shaft 25. A sprocket chain 48 is trained about sprockets 44 and 46, one reach of the chain passing partly about sprocket 45, the arrangement being such that the shaft 42 is driven by the shaft 25, and in the opposite direction to the latter. It will be understood that the sprocket chain 48 and sprockets engaged thereby, shown in exposed condition in the drawings, will be covered by suitable guards in practise so as to prevent fouling thereof by soil dislodged by the apparatus.

The shaft 25 and pulley 27 thereon are driven by the conveyor belts 28, and the latter are driven by the pulley 26 that is mounted upon driven shaft 24. For driving shaft 24, an end portion thereof is projected beyond its bearing in upper end bracket 13 and provided with a sprocket 50. Trained about the sprocket 50 is a sprocket chain 51 that also is trained about a sprocket 52, the latter being secured upon the shaft 12. For rotating the shaft 12, a sprocket 53 is secured thereon beside sprocket 52, and trained about said sprocket 53 is a sprocket chain 54 that also is trained about a sprocket 55. The latter is mounted upon a shaft 55a that projects from a reduction gear device 56 that is mounted upon the framework of the carriage 10 at the forward end thereof. For driving the device 56, the drive shaft 57 thereof carries a sprocket 58 that is connected by a sprocket chain 59 to a sprocket 60 that is mounted upon a horizontal shaft 61, the latter being journaled in suitable bearings carried by the frame of carriage 10 at one side thereof. The rear end of shaft 61 is connected, by a universal coupling 62, to the forward end of a power-driven shaft 63 that extends rearwardly, and at its rear end is suitably coupled to drive-means (not shown) that is operated by the tractor that propels the carriage 10.

Vegetables that are carried by the belts 28 to the upper end of the elevator 14 are delivered by the latter into a chute 65 that guides them into a hopper 66 that also is supported by the carriage 10, there being feed rolls 67, 67 in the bottom of the hopper for propelling the vegetables, in succession, to a bunching apparatus (not shown). The hopper 66 and feed rolls 67 are not a part of the present invention so that no further description thereof need be given herein except to note that the feed rolls 67 may be driven by the reduction gear device 56 through the agency of sprockets and chains that are shown in Fig. 1 and designated as a whole by the numeral 68.

It is believed that the operation of the harvester will be apparent from the foregoing description thereof. The harvester functions satisfactorily when propelled over the ground at the rate of 3¼ miles an hour, and the vegetables delivered by the machine are substantially free from soil and are not bruised or mutilated. The apparatus is relatively simple in construction, and readily is adjusted to digging to various depths.

Modification may be resorted to without departing from the spirit of the invention, or the scope thereof as defined by the appended claims.

What is claimed is:

1. In a vegetable harvester, the combination of digging means for removing vegetables from the ground, an inclined upwardly moving conveyor spaced rearwardly of said digging means for elevating the removed vegetables, and resilient rotating paddle blades moving in an orbit across the space between the digging means and the conveyor to impel the vegetables across said space, said blades being arranged to engage said digging means and be flexed thereby so that upon disengagement therefrom they snap back to normal position and thereby impart a sudden added impetus to the vegetables.

2. A vegetable harvester comprising a skid plate at the forward end thereof adapted to rest upon the ground and support the forward end of the harvester, a scoop pivotally mounted for angular adjustment on the leading end of the skid plate adapted to remove vegetables from the ground, and an inclined upwardly moving belt conveyor disposed above said skid and rearwardly of said scoop for elevating the vegetables dug by the latter, said skid plate having a portion at its forward end shaped in continuation of the scoop and extending from the rear margin of the latter to a point adjacent the upper reach of the conveyor.

3. A combination as defined in claim 2 including a back-sweep having blades that move across the skid portion that constitutes an extension of the scoop so as to propel vegetables thereon toward the conveyor.

4. A vegetable harvester comprising a skid plate at the forward end thereof adapted to rest upon the ground and slide thereover, a scoop at the leading end of the skid plate adapted to remove vegetables from the ground, means for adjusting the position of the scoop angularly with relation to the skid plate to vary the depth of the digging operation, and an inclined upwardly movable conveyor disposed above said skid and rearwardly of said scoop for elevating the vegetables removed by the latter.

OTTO A. STRASSMAN.